(12) United States Patent
Axmon et al.

(10) Patent No.: US 11,317,364 B2
(45) Date of Patent: Apr. 26, 2022

(54) SYNCHRONIZATION FOR EXTENDED DRX (71) Applicant: Telefonaktiebolaget LM Ericsson (publ), Stockholm (SE)

(72) Inventors: Joakim Axmon, Limhamn (SE); Esther Sienkiewicz, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 16/478,245

(22) PCT Filed: Feb. 13, 2017

(86) PCT No.: PCT/EP2017/053099
§ 371 (c)(1),
(2) Date: Jul. 16, 2019

(87) PCT Pub. No.: WO2018/145767
PCT Pub. Date: Aug. 16, 2018

(65) Prior Publication Data
US 2019/0364521 A1 Nov. 28, 2019

(51) Int. Cl.
*H04W 56/00* (2009.01)
*H04B 17/336* (2015.01)
(Continued)

(52) U.S. Cl.
CPC ........ *H04W 56/001* (2013.01); *H04B 17/336* (2015.01); *H04W 4/80* (2018.02); *H04W 72/0446* (2013.01); *H04W 76/28* (2018.02)

(58) Field of Classification Search
CPC ..... H04W 56/001; H04W 76/28; H04W 4/80; H04W 72/0446; H04B 17/336
See application file for complete search history.

(56) References Cited

U.S. PATENT DOCUMENTS

2013/0301501 A1 11/2013 Olvera-Hernandez et al.
2014/0301263 A1* 10/2014 Ji .................... H04W 52/0216
370/311
(Continued)

FOREIGN PATENT DOCUMENTS

WO 2014168537 A1 10/2014
WO 2015177774 A1 11/2015
WO 2016054855 A1 4/2016

OTHER PUBLICATIONS

"3rd Generation Partnership Project; Technical Specification Group Radio Access Network; Evolved Universal Terrestrial Radio Access (E-UTRA); Requirements for support of radio resource management (Release 13)", 3GPP TS 36.133 V13.4.0 (Jun. 2016), Jun. 2016, pp. 1-2045.

(Continued)

*Primary Examiner* — Sharmin Chowdhury
(74) *Attorney, Agent, or Firm* — Sage Patent Group (57) ABSTRACT

A wireless communication device in a 3GPP NB-IoT wireless communication network operates during an inactivity period of an eDRX cycle. An activation procedure comprises calculating, in a time reference frame inherent to the wireless communication device, an earliest and a latest point in time for obtaining a narrowband master information block (MIB-NB) transmitted by a network node in a narrowband physical broadcast channel (NPBCH) during a single NPBCH transmission time interval. Between the calculated earliest point in time and latest point in time, radio receiver circuitry is activated in the wireless communication device and at least one radio subframe comprising the NPBCH is received and decoded. By this decoding, the MIB-NB is obtained, from which a system frame number (SFN) is read. A communication procedure then comprises activating the wireless communication device according to the eDRX (Continued)

cycle, and communicating, in a designated time interval as determined by the SFN, with the network node.

19 Claims, 5 Drawing Sheets

(51) Int. Cl.
*H04W 76/28* (2018.01)
*H04W 4/80* (2018.01)
*H04W 72/04* (2009.01)

(56) References Cited

U.S. PATENT DOCUMENTS

2016/0262202 A1 9/2016 Gershoni et al.
2018/0234920 A1* 8/2018 Bae .................. H04W 52/0225

OTHER PUBLICATIONS

"A Solution to Long Paging cycles for MTC devices", 3GPP TSG GERAN #59, GP-130730, Sofia, Bulgaria, Telefon AB LM Ericsson, ST-Ericsson, Aug. 26-30, 2013, pp. 1-7.
"Design Aspects of IDLE Mode DRX", 3GPP TSG-RAN WG2 #91, R2-153735, Beijing, China, Aug. 24-28, 2015, pp. 1-4.
"Discussion and evaluation on CGI reading of eMTC", 3GPP TSG-RAN WG4 # 78 Meeting, R4-160832, St Julian's, Malta, Huawei, HiSilicon, Feb. 15-19, 2016, pp. 1-5.
"Paging and DRX in Idle mode in NB-IoT", 3GPP TSG-RAN2 Meeting #93, R2-161311, St. Julian, Malta, Feb. 15-19, 2016, pp. 1-6.

* cited by examiner

SYNCHRONIZATION FOR EXTENDED DRX

TECHNICAL FIELD

Embodiments herein relate to facilitating synchronization between a wireless communication device and a wireless communication network in scenarios where an extended discontinuous reception (eDRX) cycle is used.

BACKGROUND

The evolution of wireless communication systems has followed a sequence of "generations", from first generation analog systems and second generation (2G) digital systems that were mainly focused on providing circuit switched voice services, via third generation (3G) systems that were capable of also providing moderately high data rate packet switched services, to the current fourth generation (4G) systems in which all services are provided in terms of packet data services. A widespread 4G standard is the third generation partnership project (3GPP) long term evolution (LTE).

The work of defining a fifth generation (5G) wireless communication standard is very comprehensive and a future 5G standard should support a variety of different use cases such as mobile broadband (MBB) with massive multiple input-multiple output (MIMO) radio link support, low latency, high reliability communication, low cost machine type communication (MTC) as well as low power Internet of things (IoT) wireless communication devices that are to operate using narrowband IoT (NB-IoT).

NB-IoT has been designed for enhanced operation with respect to geographical coverage and for long operation time on battery. For example, communication between a battery powered NB-IoT wireless communication device and, e.g., a radio network node such as a radio base station shall be maintained down to a signal-to-interference-and-noise ratio (SINR) down to −15 dB, and battery operation for about 10 years shall be supported. Long battery time is facilitated by introducing longer discontinuous reception (DRX) cycles than in legacy LTE, where the longest DRX cycle is 256 radio frames or 2.56 s. Particularly, a hyper frame of 1024 radio frames or 10.24 seconds has been introduced, and the extended DRX cycle can be up to 1024 such hyper frames, or 174.8 minutes.

A drawback associated with such extended DRX cycles is that a wireless communication device, having been inactive during a period of time, may become unsynchronized with the radio network node it is to resume communication with in accordance with the extended DRX cycle. The loss of synchronization may comprise loss of carrier frequency synchronization as well as loss of timing synchronization. For example, loss of timing synchronization may be defined as a loss of synchronization between an inherent clock in the wireless communication device and a clock in the radio network node. Another definition of loss of timing synchronization may be defined as a loss of synchronization between the system frame number (SFN) as counted by the wireless communication device and as counted by the radio network node.

It has been found that prior art synchronization procedures that operate during an inactivity period of the DRX cycle (DRX Off) before an active period of the DRX cycle (DRX On) is not feasible for extended DRX cycles. A reason for this is that the time and frequency drift due to cooling of the wireless communication device hardware during extended DRX Off time causes a significantly larger timing drift and frequency deviation than in prior art situations. Particularly, for an eDRX cycle of 1024 hyper frames (174.8 minutes) the timing drift may amount to as much as ±180 ms. Hence when operating according to eDRX, the synchronization procedure before DRX On, which the wireless communication device must perform, resembles the procedure associated with power on in that the wireless communication device has to assume essentially a complete loss of serving cell timing information. Needless to say, a drawback of such a procedure is that it requires the execution of many activities with associated use of electric power and consequently early drainage of battery energy.

SUMMARY

In view of the above, an object of the present disclosure is to overcome drawbacks related to synchronization between a wireless communication device and a network node in a NB-IoT wireless communication system, in particular synchronization during an extended DRX cycle.

This object is achieved by a method performed by a wireless communication device in a third generation partnership project (3GPP) narrowband Internet-of-Things (NB-IoT) wireless communication network. The method is performed during an inactivity period of an extended discontinuous reception (eDRX) cycle. The method comprises an activation procedure that comprises calculating, in a time reference frame inherent to the wireless communication device, an earliest point in time and a latest point in time for obtaining a narrowband master information block (MIB-NB) transmitted by a network node in a narrowband physical broadcast channel (NPBCH) during a single NPBCH transmission time interval. At a point in time between the calculated earliest point in time and latest point in time, radio receiver circuitry is activated in the wireless communication device and at least one radio subframe comprising the NPBCH is received. The received at least one radio subframe is decoded and by this decoding, the MIB-NB is obtained. A system frame number (SFN) is then read from the MIB-NB and the method continues with a communication procedure that comprises activating the wireless communication device according to the eDRX cycle, and communicating, in a designated time interval as determined by the SFN, with the network node.

In other words, the SFN that is needed for communication with the network is obtained by use of a minimum amount of operations prior to the point in time when the wireless communication device is to be activated according to the the eDRX cycle (eDRX On), and thereby minimizing drainage of energy from a battery powering the wireless communication device. The minimization of the amount of operations is achieved in that the MIB-NB is obtained during one single MIB-NB window, i.e. one single NPBCH transmission time interval, during which window the repeated (once every radio frame) MIB-NB transmissions by the network node remains unchanged.

Some embodiments of the method may comprise an estimation of a period of time until the wireless communication device is to be activated according to the eDRX cycle and performing the activation procedure if the estimated period of time is below a first threshold.

That is, if the amount of time remaining until eDRX On is short, i.e. below the first threshold, then the wireless communication device implicitly knows that it has been inactive for a long time and therefor it is necessary to perform the activation procedure in order to obtain the necessary SFN.

Some embodiments of the method may comprise an estimation of a period of time until the wireless communication device is to be activated according to the eDRX cycle and, based on this estimated time period until the wireless communication device is to be activated according to the eDRX cycle, estimating a time drift between the inherent time reference frame and a time reference frame of the wireless communication network. If the absolute value of the estimated time drift is above a second threshold, then performing the activation procedure.

That is, such embodiments involve making an explicit estimation of the relative drift of the inherent clock in the wireless communication device and using the size of this drift in a decision whether or not to perform the activation procedure.

In a further aspect, there is provided a wireless communication device for a 3GPP NB-IoT wireless communication network. The wireless communication device comprises input/output circuitry, a processor and a memory. The memory contains instructions executable by the processor whereby the wireless communication device is operative, during an inactivity period of an eDRX cycle, to perform an activation procedure that comprises:

calculating, in a time reference frame inherent to the wireless communication device, an earliest point in time and a latest point in time for obtaining a MIB-NB transmitted by a network node in an NPBCH, during a single NPBCH transmission time interval, activating, at a point in time between the calculated earliest point in time and latest point in time, radio receiver circuitry in the wireless communication device, receiving at least one radio subframe comprising the NPBCH, decoding the received at least one radio subframe, by which decoding the MIB-NB is obtained, reading, from the MIB-NB, an SFN.

The wireless communication device is further operative to perform a communication procedure that comprises:

activating the wireless communication device according to the eDRX cycle, and communicating, in a designated time interval as determined by the SFN, with the network node.

In a further aspect there is provided a computer program comprising instructions which, when executed on at least one processor in a wireless communication device, cause the wireless communication device to carry out the method as summarized above. In a yet further aspect there is provided a carrier comprising such a computer program, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1:
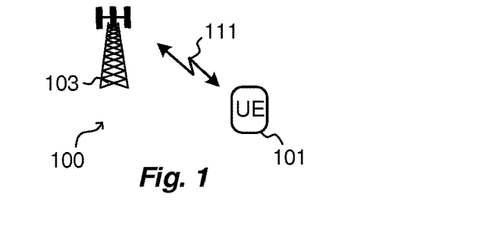
FIG. 1 schematically illustrates a wireless communication system.

Embodiments of the present disclosure may be implemented in one or more wireless communications system. FIG. 1 depicts, very schematically, such a wireless communications system 100. The wireless communications system 100 may for example be any 3GPP system, including LTE systems, or any other wireless communication system that make use of NB-IoT, including 5G systems.

The wireless communications system 100 may comprise a plurality of base stations and/or other network nodes. As exemplified in FIG. 1, the wireless communications system 100 comprises a network node 103. As the skilled person will realize, the term "network node" may correspond to any type of radio network node or any network node which communicates with at least a radio network node. For example, the network node 103 may be a radio base station. The radio base station may also be referred to as a NodeB, an evolved Node B (eNB, eNodeB), a base transceiver station (BTS), Access Point (AP) Base Station, Wi-Fi AP, base station router, or any other network unit capable of communicating with a wireless communication device within a coverage area, cell or radio beam (not illustrated in FIG. 1) served or maintained by a base station.

In embodiments herein the network node 103 is configured to communicate with and thereby serve wireless communication devices, such as a wireless communication device 101, also referred to as a user equipment (UE) herein. The wireless communication device 101 may, e.g., be in the form of a mobile terminal or a wireless terminal, a mobile phone, a smartphone, a computer such as a laptop, a Personal Digital Assistant (PDA) or a tablet computer, with wireless capability, target device, device to device UE, machine type communication (MTC) UE, Laptop Embedded Equipment (LEE), Laptop Mounted Equipment (LME), universal serial bus (USB) dongles etc. or any other radio network units capable to communicate over a radio link in a wireless communications system. It is to be noted that the term user equipment used in this disclosure also covers other wireless devices such as Machine to machine (M2M) devices and any type of Internet-of-things (IoT) device, even though they are typically not directly operated by a user.

FIG. 1 illustrates an exemplifying scenario in the wireless communication system 100 where the network node 103 communicates with the wireless communication device 101 via a radio interface that involves NB-IoT communication and, in particular, communication in a NPBCH 111.

As the skilled person will realize, the wireless communication device 101 comprises suitably configured functional units that are capable of, e.g., receiving and decoding radio signals, in addition to processing of information that emanate from such reception and decoding that is discussed in the present disclosure.

Turning now to FIGS. 2a-b, FIGS. 3a-g and with continued reference to FIG. 1, embodiments of a method that is performed by a wireless communication device 101 in a 3GPP NB-IoT wireless communication network 100 will be described in some detail.

Figure 2A:
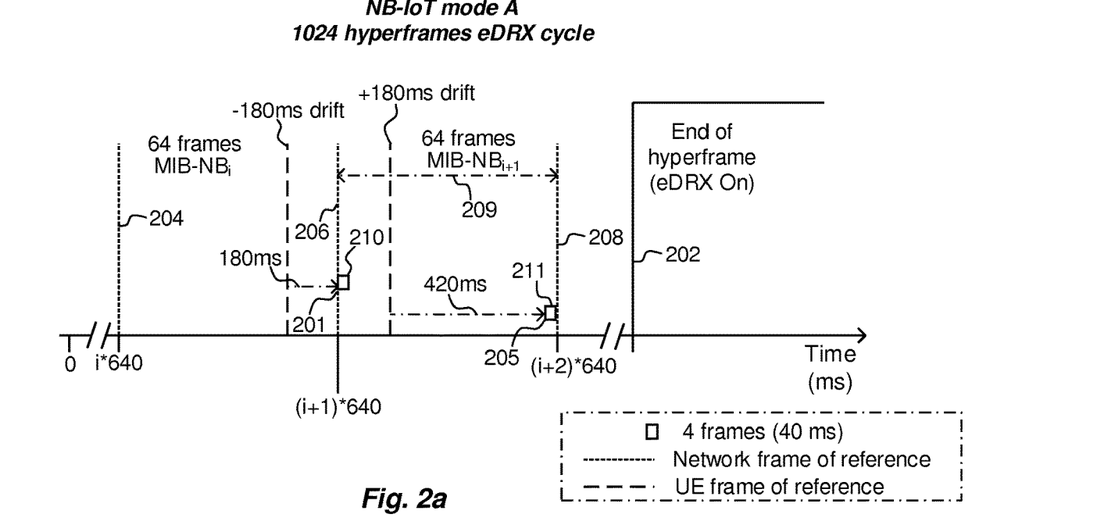
FIGS. 2a and 2b schematically illustrate timings in relation to eDRX cycles.

The method is performed during an inactivity period of an eDRX cycle. Such an eDRX cycle is partly illustrated in the timing diagrams of FIGS. 2a and 2b, where the end 202 of such eDRX cycle is indicated. In FIG. 2a, the timing diagram illustrates various timings (as will be described in detail in the following) associated with the NB-IoT being configured with a eDRX cycle that is 1024 hyperframes (i.e. 174.8 minutes) and in FIG. 2b, the timing diagram illustrates various timings associated with the NB-IoT being configured with a eDRX cycle that is 512 hyperframes (i.e. 87.4 minutes).

Figure 2B:
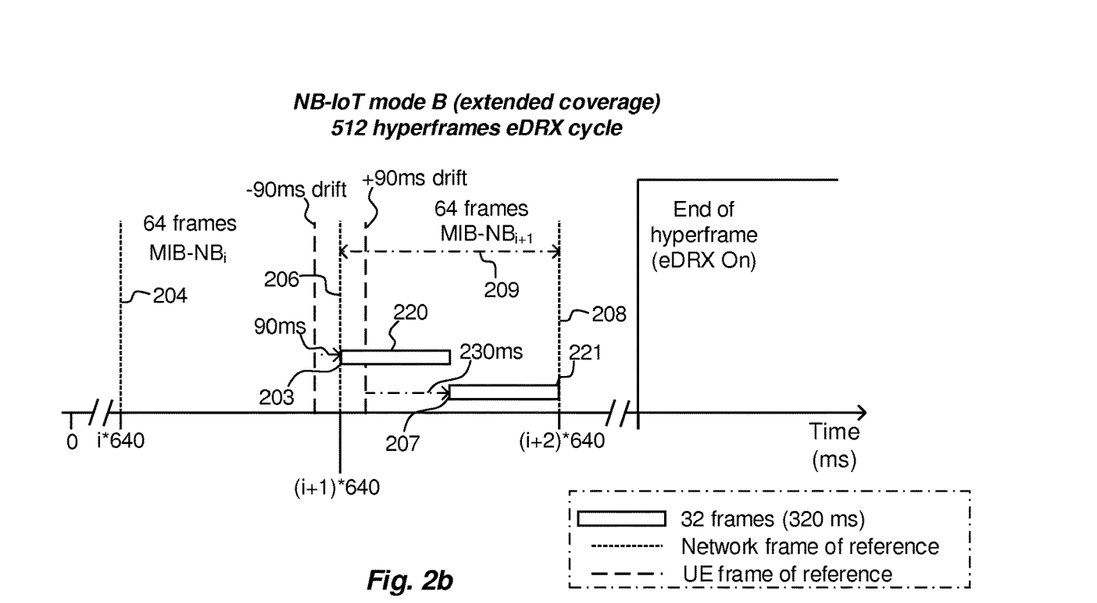

The dotted lines in FIGS. 2a and 2b are in a time reference frame of the network node 103 and they indicate the boundaries of the 64 radio frame window within which the information in the broadcasted NPBCH MIB-NB instances (i.e. parts of subframes, transport blocks in the physical layer) remains the same. That is, the number of NPBCH instances that are required in order to successfully decode MIB-NB depends on the SINR. NPBCH, which carries the MIB-NB, is transmitted in subframe 0 of every radio frame and with a period of 64 radio frames (640 ms). Since there is a difference of 9 dB between the breakpoint for NB-IoT Mode A and Mode B operation, roughly 8 times more NPBCH-instances will have to be used in Mode B than in Mode A. (Noting here that operation of NB-IoT in Mode A corresponds to operation at a SINR that is −6 dB and operation of NB-IoT in Mode B corresponds to operation at a SINR that is −15 dB.)

It shall be noted that the NPBCH instances that are combined in the decoding of the MIB have to stem from the same 640 ms period. The boundaries 204, 206, 208 between subsequent 640 ms windows are indicated as i*640, (i+1)*640 etc. From this it follows that, in a worst case if N instances are needed for successful decoding, N−1 instances have been acquired from the previous 640 ms period, whereby another N instances have to be acquired. This problem is the so-called tail latency, leading to that in worst case 2N−1 instances of the NPBCH have to be acquired in order to successfully decode the MIB. This is illustrated in the following table that contain MIB-NB acquisition times with and without tail latency:

| SINR [dB] | NPBCH instances | |
| --- | --- | --- |
|  | Net (ms) | Including tail (ms) |
| −6 | 4 (40) | 7 (70) |
| −15 | 32 (320) | 63 (630) |

Having recognized these problems, it has been found that savings of radio on-time (and thereby savings in energy consumption) may be achieved by considering the uncertainty in timing due to drift of the time reference frames of the wireless communication device 101 in relation to the time reference frame of the network node 103. If the uncertainty on position within the 640 ms period is small enough to leave the required net number of NPBCH instances for successful decoding (as the table above illustrates), the wireless communication device 101 can select a starting position for the MIB acquisition where crossing of a 640 ms boundary 204, 206, 208 is avoided and thereby avoiding the drawback associated with tail latency. For instance, over the course of the maximum eDRX cycle (1024 hyper frames; 174.8 min) the timing can drift up to ±180 ms.

Hence, when operating in NB-IoT Mode A at a SINR of −6 dB, the wireless communication device 101 may start the MIB acquisition anywhere in the interval of 180 ms to 420 ms into the 640 ms period, according to its notion of the timing. Doing so will guarantee that the four instances of MIB-NB are collected in the same 640 ms period, despite the worst case drift that can arise. This earliest point in time (180 ms) is illustrated in FIG. 2a by the block 210 at time 201 and this latest point in time (420 ms) is illustrated in FIG. 2a by the block 211 at time 205.

When operating in NB-IoT Mode B at a SINR of −15 dB, it may not be possible to avoid the tail latency in case the maximum eDRX cycle is used. However, as illustrated in FIG. 2b, for a shorter eDRX cycle of 512 hyper frames (87.4 min), the timing drift can be up to ±90 ms. By taking a starting point in the interval 90 ms to 230 ms into the 640 ms period it can be guaranteed that the 32 instances of MIB are acquired from the same 640 ms period, and thus that radio time penalty due to tail latency is avoided. This earliest point in time (90 ms) is illustrated in FIG. 2b by the block 220 at time 203 and this latest point in time (230 ms) is illustrated in FIG. 2b by the block 221 at time 207.

Figure 3A:
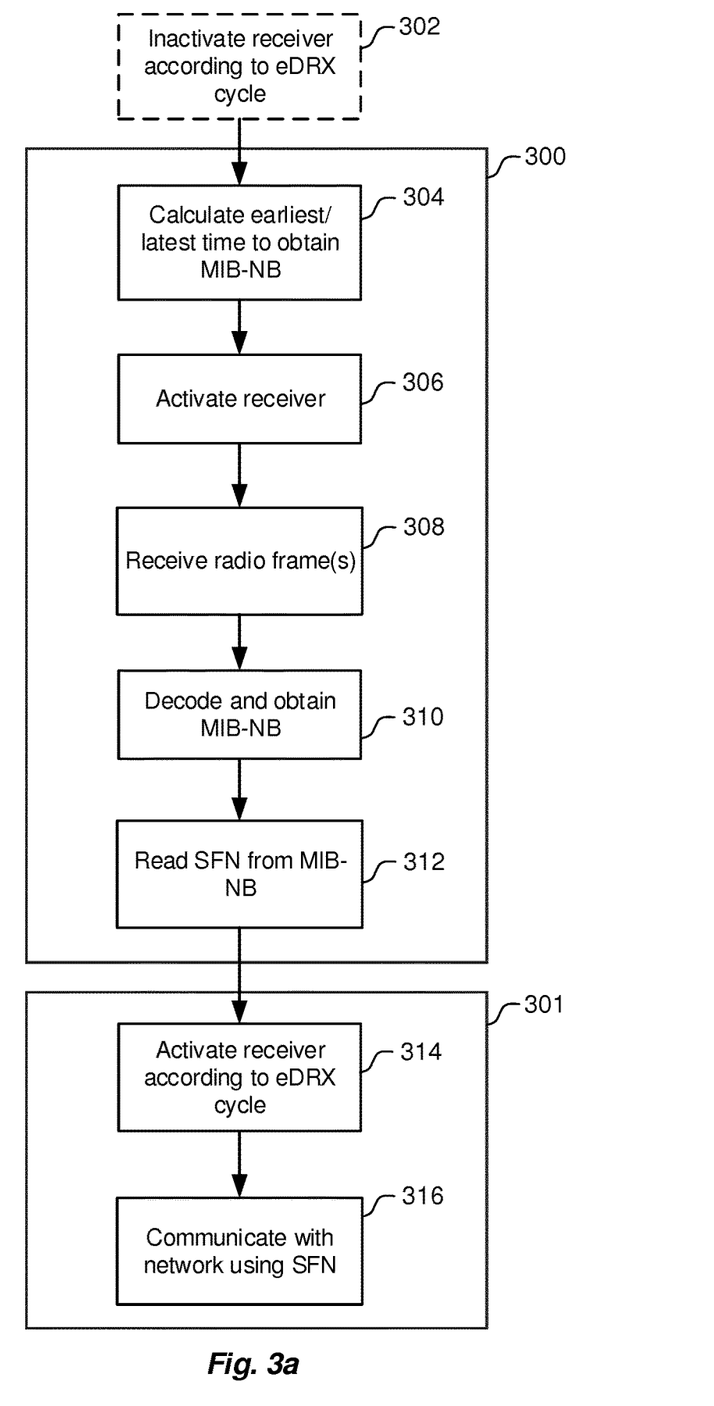
FIGS. 3a-g are flowcharts of methods.

Continuing now with reference to FIG. 3a, the method performed during an inactivity period of an eDRX cycle, e.g. as discussed above in relation to FIGS. 2a and 2b, comprises a number of actions as follows.

An optional action 302, in which radio receiver circuitry is inactivated according to the eDRX cycle, may precede an activation procedure 300 that comprises:

Action 304

A calculation is made, in a time reference frame inherent to the wireless communication device 101, an earliest point in time 201, 203 and a latest point in time 205, 207 for obtaining a MIB-NB transmitted by the network node 103 in the NPBCH 111, during a single NPBCH transmission time interval 209.

Action 306

At a point in time between the calculated earliest point in time 201, 203 and latest point in time 205, 207, radio receiver circuitry is activated in the wireless communication device 101.

The exact point in time of the activation may depend on various factors relating to the processing capability of the wireless communication device 101. However, the exact point in time is not essential for the purpose of the present disclosure.

Action 308

At least one radio subframe comprising the NPBCH is received.

Action 310

The received at least one radio subframe is decoded, by which decoding the MIB-NB is obtained.

Action 312

An SFN is read from the MIB-NB.

Following the activation procedure 300, a communication procedure 301 comprises:

Action 314

The wireless communication device 101 is activated according to the eDRX cycle.

Action 316

Communication with the network node 103 then commences in a designated time interval as determined by the SFN.

That is, having obtained the SFN used by the network node 103, the wireless communication device 101 and the network node 103 are synchronized.

Figure 3B:
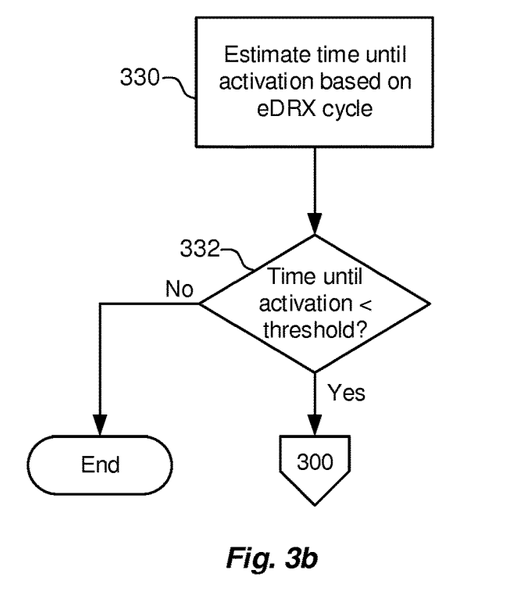

As illustrated in FIG. 3b, the activation procedure 300 and the subsequent communication procedure 301, may be subject to a condition as follows:

Action 330

An estimation is made of a period of time until the wireless communication device is to be activated according to the eDRX cycle.

Such an estimate may be done, e.g., simply by referring to an internal clock in the wireless communication device 101.

Action 332

A check is made if the period of time estimated in action 330 is below a first threshold, and if this is the case, the activation procedure takes place.

Figure 3C:
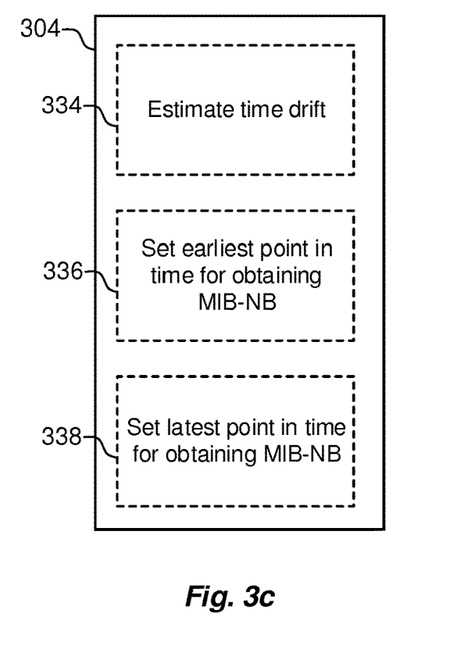

In such embodiments, as illustrated in FIG. 3c, the calculation in action 304 may comprise the following actions:

Action 334

An estimation is made of a time drift between the inherent time reference frame (in the wireless communication device 101) and a time reference frame of the wireless communication network 100. The estimation is based on the estimated time until the wireless communication device 101 is to be activated according to the eDRX cycle.

Action 336

Setting the earliest point in time 201, 203 for obtaining the MIB-NB to a point in time that is based at least on the time drift estimated in action 334. For example, setting the earliest point in time 201, 203 for obtaining the MIB-NB to a point in time that is the absolute value of the estimated time drift into the future.

Action 338

Setting the latest point in time 205, 207 for obtaining the MIB-NB to a point in time that is based at least on the duration of the NPBCH transmission period, the time drift estimated in action 334 and the duration 210, 211, 220, 221 of a number of radio frames needed for the decoding of the NPBCH. For example, setting the latest point in time 205, 207 for obtaining the MIB-NB to a point in time that is the duration of the NPBCH transmission period minus the absolute value of the time drift minus the duration 210, 211, 220, 221 of a number of radio frames needed for the decoding of the NPBCH.

Figure 3D:
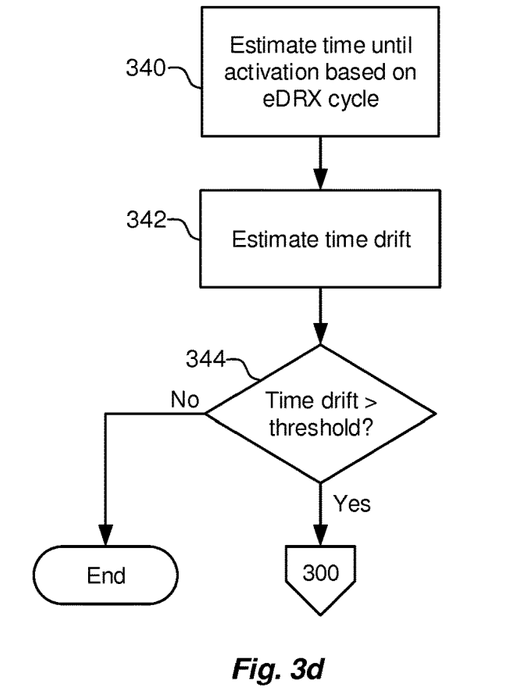

As illustrated in FIG. 3d, the activation procedure 300 and the subsequent communication procedure 301, may be subject to a condition as follows:

Action 340

An estimation is made of a period of time until the wireless communication device is to be activated according to the eDRX cycle.

Action 342

An estimation is made of a time drift between the inherent time reference frame (in the wireless communication device 101) and a time reference frame of the wireless communication network 100. This estimation is based on the estimation, in action 340, of the time until the wireless communication device 101 is to be activated according to the eDRX cycle.

Action 344

A check is made if the absolute value of the time drift estimated in action 342 is above a second threshold, and if this is the case the activation procedure takes place.

Figure 3E:
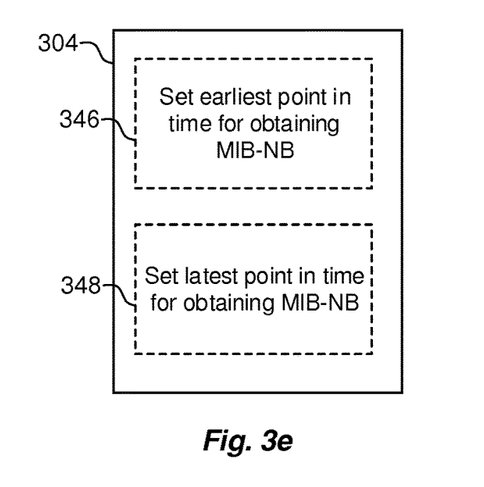

In such embodiments, as illustrated in FIG. 3e, the calculation in action 304 may comprise the following actions:

Action 346

Setting the earliest point in time 201, 203 for obtaining the MIB-NB is set to a point in time that is based at least on the time drift estimated in action 342. For example, setting the earliest point in time 201, 203 for obtaining the MIB-NB to a point in time that is the absolute value of the estimated time drift into the future.

Action 348

Setting the latest point in time 205, 207 for obtaining the MIB-NB to a point in time that is based at least on the duration of the NPBCH transmission period, the time drift estimated in action 342 and the duration 210, 211, 220, 221 of a number of radio frames needed for the decoding of the NPBCH. For example, setting the latest point in time 205, 207 for obtaining the MIB-NB to a point in time that is the duration of the NPBCH transmission period minus the absolute value of the time drift minus the duration 210, 211, 220, 221 of a number of radio frames needed for the decoding of the NPBCH.

Figure 3F:
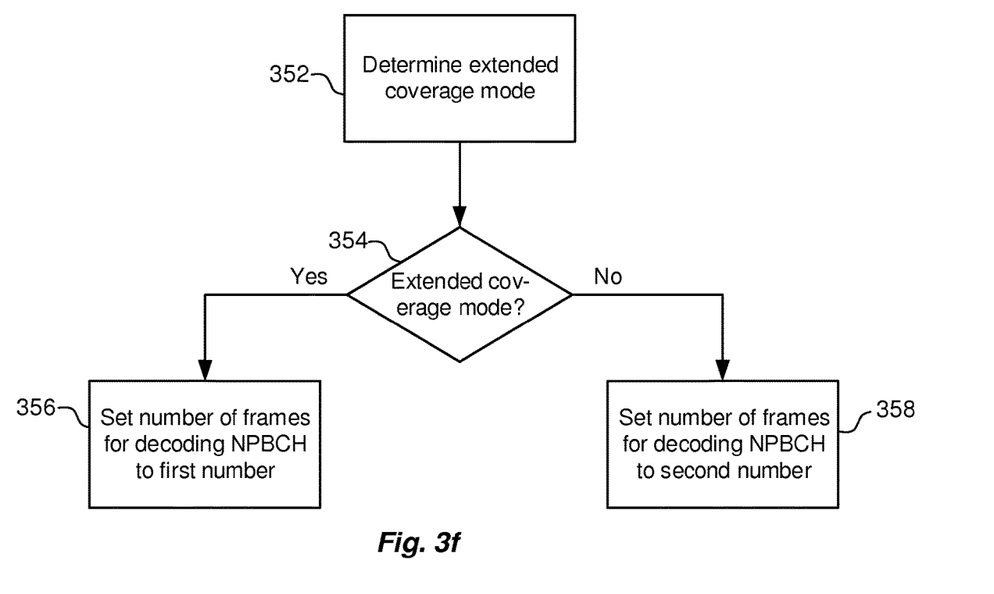

As illustrated in FIG. 3f, some embodiments may comprise the following actions:

Action 352

A determination is made of whether the wireless communication device 101 is operating in extended coverage mode.

Action 354

If it is determined in action 354 that the wireless communication device 101 is operating in extended coverage mode, then the number of radio frames needed for the decoding of the NPBCH is set to a first number in an action 356. Conversely, if it is determined that the wireless communication device 101 is not operating in extended coverage mode, the number of radio frames needed for the decoding of the NPBCH is set to a second number in an action 358, the second number being equal to or lower than the first number.

Figure 3G:
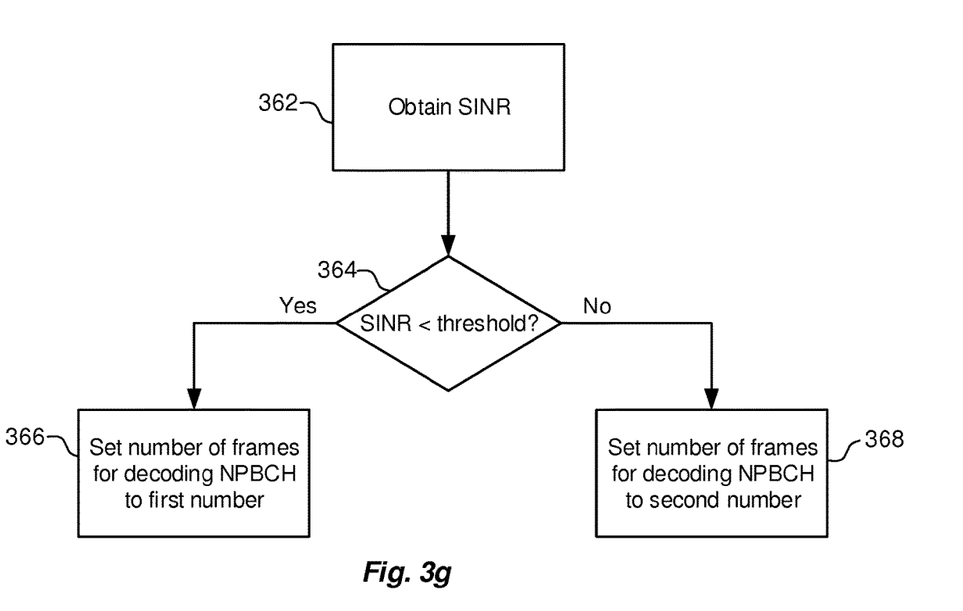

As illustrated in FIG. 3g, some embodiments may comprise the following actions:

Action 362

A signal to interference and noise, SINR, value is obtained that is representative of radio signals received in the wireless communication device 101.

Action 364

If the obtained SINR is less than a SINR threshold value, the number of radio frames needed for the decoding of the NPBCH is set to a first number in an action 366. Conversely, if the obtained SINR is at least the SINR threshold value, the number of radio frames needed for the decoding of the NPBCH is set to a second number in an action 368, the second number being equal to or lower than the first number.

Referring to FIGS. 3f and 3g, the first number of radio frames needed for the decoding of the NPBCH may be 32 and the second number of radio frames needed for the decoding of the NPBCH may be 4 and the SINR threshold value may be −6 decibel (dB). In other words, such specific number examples may correspond to the two different contexts relating to whether the network 100 is operating according to NB-IoT Mode A or ModeB.

Figure 4:
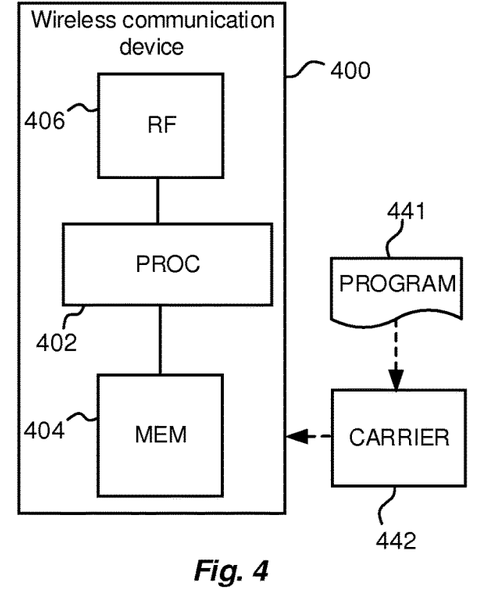
FIG. 4 schematically illustrates a wireless communication device.

Turning now to FIG. 4, and with continued reference to FIG. 1 and FIGS. 2a and 2b, a wireless communication device 400 will be described in some detail. The wireless communication device 400, which may correspond to the wireless communication device 101 in FIG. 1, is for a third generation partnership project, 3GPP, narrowband Internet-of-Things, NB-IoT, wireless communication network such as the network 100 in FIG. 1. The wireless communication device 400 comprises input/output circuitry 406, a processor 402 and a memory 404. The memory contains instructions executable by the processor 402 whereby the wireless communication device 400 is operative, during an inactivity period of an extended discontinuous reception, eDRX, cycle, to perform an activation procedure that comprises:

calculating, in a time reference frame inherent to the wireless communication device 400, an earliest point in time 201, 203 and a latest point in time 205, 207 for obtaining a narrowband master information block, MIB-NB, transmitted by a network node 103 in a narrowband physical broadcast channel, NPBCH 111, during a single NPBCH transmission time interval 209, activating, at a point in time between the calculated earliest point in time 201, 203 and latest point in time 205, 207, radio receiver circuitry 406 in the wireless communication device 400, receiving at least one radio subframe comprising the NPBCH 111, decoding the received at least one radio subframe, by which decoding the MIB-NB is obtained, reading, from the MIB-NB, a system frame number, SFN.

The wireless communication device 4004 is further operative to perform a communication procedure that comprises:

activating the wireless communication device 400 according to the eDRX cycle, and communicating, in a designated time interval as determined by the SFN, with the network node 103.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the wireless communication device 400 is operative to:

estimate a period of time until the wireless communication device 400 is to be activated according to the eDRX cycle, and perform, if the estimated period of time is below a first threshold, the activation procedure.

In some embodiments, the wireless communication device 400 is operative such that the calculation of the earliest point in time 201, 203 for obtaining the MIB-NB comprises:

estimating, based on the estimated time until the wireless communication device 400 is to be activated according to the eDRX cycle, a time drift between the inherent time reference frame and a time reference frame of the wireless communication network 100, setting the earliest point in time 201, 203 for obtaining the MIB-NB to a point in time that is based at least on the time drift, and operative such that the calculation of the latest point in time 205, 207 for obtaining the MIB-NB comprises:

setting the latest point in time 205, 207 for obtaining the MIB-NB to a point in time that is based at least on the duration of the NPBCH transmission period, the time drift and the duration 210, 211, 220, 221 of a number of radio frames needed for the decoding of the NPBCH 111.

In some embodiments, the wireless communication device 400 is operative to:

estimate a period of time until the wireless communication device 400 is to be activated according to the eDRX cycle, estimate, based on the estimated time until the wireless communication device 400 is to be activated according to the eDRX cycle, a time drift between the inherent time reference frame and a time reference frame of the wireless communication network 100, and perform, if the absolute value of the estimated time drift is above a second threshold, the activation procedure.

In some embodiments, the wireless communication device 400 is operative such that the calculation of the earliest point in time 201, 203 for obtaining the MIB-NB comprises:

setting the earliest point in time 201, 203 for obtaining the MIB-NB to a point in time that is based at least on the time drift, and where the calculation of the latest point in time 205, 207 for obtaining the MIB-NB comprises:

setting the latest point in time 205, 207 for obtaining the MIB-NB to a point in time that is based at least on the duration of the NPBCH transmission period, the time drift and the duration 210, 211, 220, 221 of a number of radio frames needed for the decoding of the NPBCH 111.

In some embodiments, the wireless communication device 400 is operative such that the setting of the earliest point in time 201, 203 for obtaining the MIB-NB comprises:

setting the earliest point in time 201, 203 for obtaining the MIB-NB to a point in time that is the absolute value of the estimated time drift into the future, and operative such that the setting of the latest point in time 205, 207 for obtaining the MIB-NB comprises:

setting the latest point in time 205, 207 for obtaining the MIB-NB to a point in time that is the duration of the NPBCH transmission period minus the absolute value of the time drift minus the duration 210, 211, 220, 221 of a number of radio frames needed for the decoding of the NPBCH 111.

In some embodiments, the wireless communication device 400 is operative to:

determine whether the wireless communication device 400 is operating in extended coverage mode, set, if the wireless communication device 400 is operating in extended coverage mode, the number of radio frames needed for the decoding of the NPBCH 111 to a first number, and set, if the wireless communication device 400 is not operating in extended coverage mode, the number of radio frames needed for the decoding of the NPBCH 111 to a second number, the second number being equal to or lower than the first number.

In some embodiments, the wireless communication device 400 is operative to:

obtain a signal to interference and noise, SINR, value representative of radio signals received in the wireless communication device 400, set, if the SINR is less than a SINR threshold value, the number of radio frames needed for the decoding of the NPBCH 111 to a first number, and set, if the SINR is at least the SINR threshold value, the number of radio frames needed for the decoding of the NPBCH 111 to a second number, the second number being equal to or lower than the first number.

In some embodiments, the wireless communication device 400 is operative such that:

the SINR threshold value is −6 decibel, dB.

In some embodiments, the wireless communication device 400 is operative such that:

the first number of radio frames needed for the decoding of the NPBCH 111 is 32, and the second number of radio frames needed for the decoding of the NPBCH 111 is 4.

Figure 5:
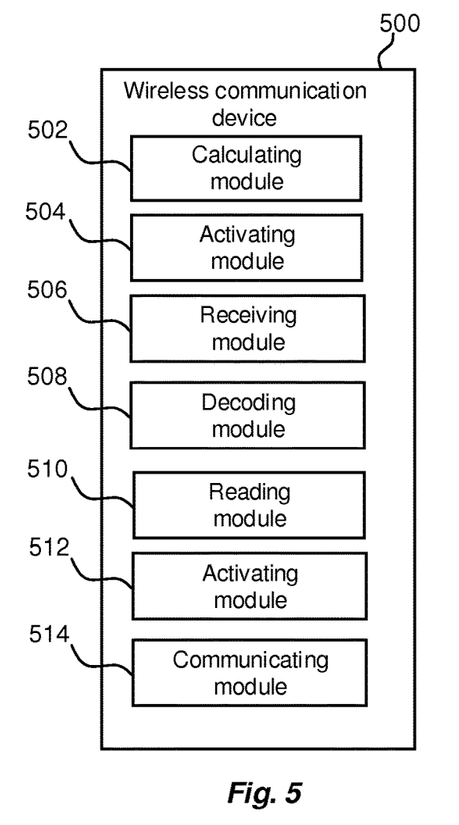
FIG. 5 schematically illustrates a wireless communication device.

Turning now to FIG. 5 and with continued reference to FIG. 1 and FIGS. 2*a* and 2*b*, a wireless communication device 500 will be described in some more detail. The wireless communication device 500, which may correspond to the wireless communication device 101 in FIG. 1, is for is for a third generation partnership project, 3GPP, narrowband Internet-of-Things, NB-IoT, wireless communication network such as the network 100 in FIG. 1. The wireless communication device 500 comprises modules, whereby the wireless communication device 500 is operative, during an inactivity period of an extended discontinuous reception, eDRX, cycle, to perform an activation procedure, that comprise:
- a calculating module 502 configured to calculate, in a time reference frame inherent to the wireless communication device 500, an earliest point in time 201, 203 and a latest point in time 205, 207 for obtaining a narrowband master information block, MIB-NB, transmitted by a network node 103 in a narrowband physical broadcast channel, NPBCH 111, during a single NPBCH transmission time interval 209,
- an activating module 504 configured to activate, at a point in time between the calculated earliest point in time 201, 203 and latest point in time 205, 207, radio receiver circuitry in the wireless communication device 500,
- a receiving module 506 configured to receive at least one radio subframe comprising the NPBCH 111,
- a decoding module 508 configured to decode the received at least one radio subframe, by which decoding the MIB-NB is obtained,
- a reading module 510 configured to read, from the MIB-NB, a system frame number, SFN,
- an activating module 512 configured to activate the wireless communication device 500 according to the eDRX cycle, and
- a communicating module 514 configured to communicate, in a designated time interval as determined by the SFN, with the network node 103.

The wireless communication device 500 may comprise further modules that are configured to perform in a similar manner as, e.g., the wireless communication device 400 described above in connection with FIG. 4.

The invention claimed is:

1. A method performed by a wireless communication device in a third-generation partnership project (3GPP) narrowband Internet-of-Things (NB-IoT) wireless communication network, the method being performed during an inactivity period of an extended discontinuous reception (eDRX) cycle, the method comprising:
  estimating a period of time until the wireless communication device is to be activated according to the eDRX cycle; and
  performing an activation procedure if the estimated period of time is below a first threshold;
  wherein the activation procedure comprises:
    calculating, in a time reference frame inherent to the wireless communication device, an earliest point in time and a latest point in time for obtaining a narrowband master information block (MIB-NB) transmitted by a network node in a narrowband physical broadcast channel (NPBCH) during a single NPBCH transmission time interval;
    activating, at a point in time between the calculated earliest point in time and the calculated latest point in time, radio receiver circuitry in the wireless communication device;
    receiving at least one radio subframe comprising the NPBCH;
    decoding the received at least one radio subframe, from which the MIB-NB is obtained; and
    reading, from the MIB-NB, a system frame number (SFN); and
    a communication procedure that comprises:
      activating the wireless communication device according to the eDRX cycle; and
      communicating with the network node in a designated time interval as determined by the SFN.

2. The method of claim 1, wherein:
calculating the earliest point in time for obtaining the MIB-NB comprises:
  estimating, based on the estimated period of time until the wireless communication device is to be activated according to the eDRX cycle, a time drift between the inherent time reference frame and a time reference frame of the wireless communication network; and
  setting the earliest point in time for obtaining the MIB-NB to a point in time that is based on the time drift; and
calculating the latest point in time for obtaining the MIB-NB comprises setting the latest point in time for obtaining the MIB-NB to a point in time that is based on the following: a duration of the NPBCH transmission time interval, the time drift, and a duration of a number of radio frames needed for the decoding of the NPBCH.

3. The method of claim 1, further comprising:
based on the estimated period of time, estimating a time drift between the inherent time reference frame and a time reference frame of the wireless communication network; and
if an absolute value of the estimated time drift is above a second threshold, performing the activation procedure.

4. The method of claim 3, wherein:
calculating the earliest point in time for obtaining the MIB-NB comprises setting the earliest point in time for obtaining the MIB-NB to a point in time that is based on the time drift; and
calculating the latest point in time for obtaining the MIB-NB comprises setting the latest point in time for obtaining the MIB-NB to a point in time based on the following: a duration of the NPBCH transmission time interval, the time drift, and a duration of a number of radio frames needed for the decoding of the NPBCH.

5. The method of claim 2, wherein:
the earliest point in time for obtaining the MIB-NB is set to a point in time that is an absolute value of the estimated time drift into the future; and
the latest point in time for obtaining the MIB-NB is set to a point in time that is the duration of the NPBCH transmission time interval minus the absolute value of the estimated time drift minus the duration of the number of radio frames needed for the decoding of the NPBCH.

6. The method of claim 2, further comprising:
determining whether the wireless communication device is operating in an extended coverage mode;
based on determining that the wireless communication device is operating in the extended coverage mode, setting the number of radio frames needed for the decoding of the NPBCH to a first number; and
based on determining that the wireless communication device is not operating in the extended coverage mode, setting the number of radio frames needed for the decoding of the NPBCH to a second number,
wherein the second number is less than or equal to the first number.

7. The method of claim 2, further comprising:
obtaining a signal to interference and noise ratio (SINR) value representative of radio signals received in the wireless communication device;
if the SINR is less than a SINR threshold value, setting the number of radio frames needed for the decoding of the NPBCH to a first number; and
if the SINR is at least the SINR threshold value, setting the number of radio frames needed for the decoding of the NPBCH to a second number,
wherein the second number is less than or equal to the first number.

8. The method of claim 7, wherein the SINR threshold value is −6 dB.

9. The method of claim 6, wherein:
the first number of radio frames needed for the decoding of the NPBCH is 32; and the
second number of radio frames needed for the decoding of the NPBCH is 4.

10. A wireless communication device for a third-generation partnership project (3GPP) narrowband Internet-of-Things (NB-IoT) wireless communication network, the wireless communication device comprising:
input/output circuitry;
a processor; and
a memory containing instructions executable by said processor whereby said wireless communication device is operative, during an inactivity period of an extended discontinuous reception (eDRX) cycle, to:
estimate a period of time until the wireless communication device is to be activated according to the eDRX cycle; and
perform an activation procedure if the estimated period of time is below a first threshold;
perform the activation procedure that comprises to:
calculate, in a time reference frame inherent to the wireless communication device, an earliest point in time and a latest point in time to obtain a narrowband master information block (MIB-NB) transmitted by a network node in a narrowband physical broadcast channel (NPBCH) during a single NPBCH transmission time interval;
activate, at a point in time between the calculated earliest point in time and the calculated latest point in time, radio receiver circuitry in the wireless communication device;
receive at least one radio subframe comprising the NPBCH;
decode the received at least one radio subframe, by which the MIB-NB is obtained; and
read, from the MIB-NB, a system frame number (SFN); and
perform a communication procedure that comprises to:
activate the wireless communication device according to the eDRX cycle; and
communicate with the network node in a designated time interval as determined by the SFN.

11. The wireless communication device of claim 10, wherein:
to calculate the earliest point in time to obtain the MIB-NB, the wireless communication device is operative to:
estimate, based on the estimated period of time until the wireless communication device is to be activated according to the eDRX cycle, a time drift between the inherent time reference frame and a time reference frame of the wireless communication network; and
set the earliest point in time to obtain the MIB-NB to a point in time that is based on the time drift; and
to calculate the latest point in time to obtain the MIB-NB, the wireless communication device is operative to set the latest point in time to obtain the MIB-NB to a point in time that is based on the following: a duration of the NPBCH transmission time interval, the time drift, and a duration of a number of radio frames needed to decode the NPBCH.

12. The wireless communication device of claim 10, wherein the memory also contains instructions executable by said processor whereby said wireless communication device is further operative to:
based on the estimated period of time, estimate a time drift between the inherent time reference frame and a time reference frame of the wireless communication network; and
if an absolute value of the estimated time drift is above a second threshold, perform the activation procedure.

13. The wireless communication device of claim 12, wherein:
to calculate the earliest point in time to obtain the MIB-NB, the wireless communication device is operative to set the earliest point in time to obtain the MIB-NB to a point in time that is based on the time drift; and
to calculate the latest point in time to obtain the MIB-NB, the wireless communication device is operative to set the latest point in time to obtain the MIB-NB to a point in time based on the following: a duration of the NPBCH transmission time interval, the time drift, and a duration of a number of radio frames needed to decode the NPBCH.

14. The wireless communication device of claim 11, wherein:
the earliest point in time to obtain the MIB-NB is set to a point in time that is an absolute value of the estimated time drift into the future; and
the latest point in time to obtain the MIB-NB is set to a point in time that is the duration of the NPBCH transmission time interval minus the absolute value of the estimated time drift minus the duration of the number of radio frames needed to decode the NPBCH.

15. The wireless communication device of claim 11, wherein the memory also contains instructions executable by said processor whereby said wireless communication device is further operative to:
determine whether the wireless communication device is operational in an extended coverage mode;
based on a determination that the wireless communication device is operational in the extended coverage mode, set the number of radio frames needed to decode the NPBCH to a first number; and
based on a determination that the wireless communication device is not operational in the extended coverage mode, set the number of radio frames needed to decode the NPBCH to a second number,
wherein the second number is less than or equal to the first number.

16. The wireless communication device of claim 11, wherein the memory also contains instructions executable by said processor whereby said wireless communication device is further operative to:
obtain a signal to interference and noise ratio (SINR) value representative of radio signals received in the wireless communication device;

if the SINR is less than a SINR threshold value, set the number of radio frames needed to decode the NPBCH to a first number; and if the SINR is at least the SINR threshold value, set the number of radio frames needed to decode the NPBCH to a second number, wherein the second number is less than or equal to the first number.

17. The wireless communication device of claim 16, wherein the SINR threshold value is −6 dB.

18. The wireless communication device of claim 15, wherein:

the first number of radio frames needed to decode the NPBCH is 32; and the second number of radio frames needed to decode the NPBCH is 4.

19. A non-transitory computer-readable medium, having stored thereon computer-executable instructions that, when executed on at least one processor in a wireless communication device, configure the wireless communication device to perform operations corresponding to the method of claim 1.

* * * * *